UNITED STATES PATENT OFFICE.

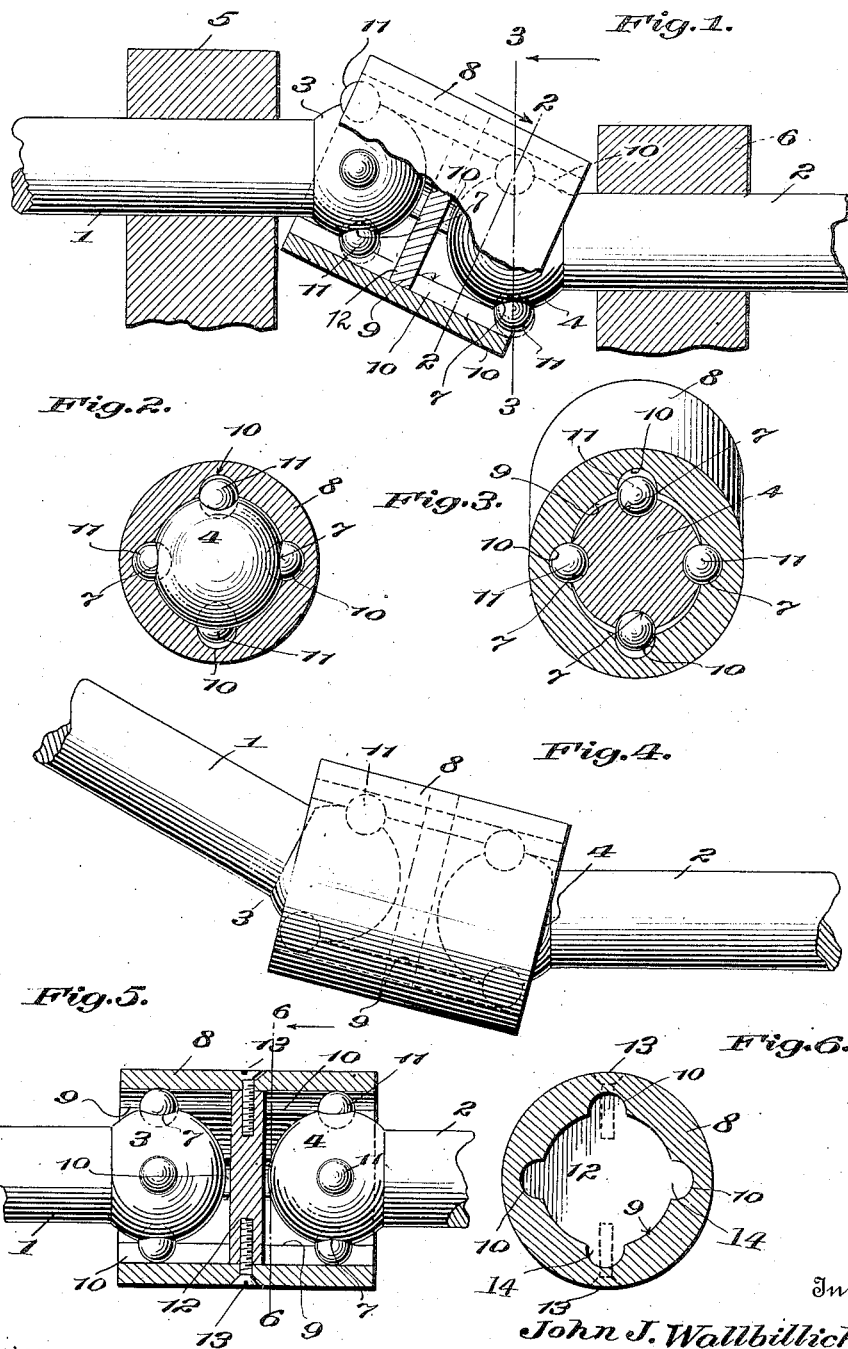

JOHN J. WALLBILLICH, OF DETROIT, MICHIGAN.

SHAFT-COUPLING.

1,103,716.　　　　　Specification of Letters Patent.　　Patented July 14, 1914.

Application filed February 19, 1913. Serial No. 749,492.

*To all whom it may concern:*

Be it known that I, JOHN J. WALLBILLICH, a citizen of the United States, residing at Detroit, in the county of Wayne and State of Michigan, have invented new and useful Improvements in Shaft-Couplings, of which the following is a specification.

This invention relates to a universal shaft coupling for use in connecting driving and driven shaft sections which are disposed at an angle to each other or whose axes are relatively spaced and parallel.

The primary object of the invention is to provide a coupling of this character which consists of few parts of simple construction, which may be quickly and easily assembled to form a joint which will be efficient and positive in action without danger of becoming disconnected or causing lost motion.

Another object is to provide a universal joint including a hollow, cylindrical body having a plurality of relatively spaced longitudinally extending grooves in its inner periphery extending through the ends thereof, spherical heads provided upon the adjacent ends of the driving and driven shaft sections, which are adapted to project into the opposite ends of the said body and which are provided with circumferentially spaced ball sockets adapted to register with the body grooves, and bearing balls mounted within the sockets of the shaft heads and engaged within the body grooves. By employing this construction, the grooves in the body of the device may be constructed readily and accurately, thus rendering the body inexpensive in the cost of manufacture and capable of being quickly applied to the heads of the shaft sections without the necessity of applying and adjusting flanged caps or other securing means, means being provided for the purpose of retaining the body in proper operative relation to the shaft heads during its use. The said body is also adapted to allow for considerable end thrust of either shaft, and may be turned end for end when it is desired to reverse the position thereof for any reason.

The invention consists in the features of construction, combination and arrangement of parts, hereinafter fully described and claimed, reference being had to the accompanying drawing, in which:

Figure 1 is a fragmentary side elevation of the device in use, showing the shaft sections disposed with their axes parallel to each other; Fig. 2 is a transverse sectional view taken on line 2—2 of Fig. 1; Fig. 3 is a similar sectional view taken on line 3—3 of Fig. 1; Fig. 4 is a fragmentary side elevation of the device showing the shaft sections disposed with their axes at an angle to each other; Fig. 5 is a longitudinal sectional view taken through the device, showing the shaft sections arranged with their axes coincident; and Fig. 6 is a transverse sectional view taken on line 6—6 of Fig. 5.

Referring to the drawing and in particular to Figs. 1 to 4 inclusive, it will be seen that I have provided the adjacent ends of the driving and driven shaft sections 1 and 2 with spherical heads 3 and 4 respectively, the said shaft sections being shown in Figs. 1 to 3 as mounted in parallel relation to each other in suitable bearings 5 and 6 which are disposed in close proximity to the said heads, whereas, in Fig. 4, the shaft sections are disposed at an angle to each other. The head of each shaft section is provided with a plurality of circumferentially spaced, semi-spherical sockets 7, whose centers are disposed in a plane intersecting the axis of the spherical head at right angles to the longitudinal axis of the shaft section. A hollow, cylindrical body 8 is adapted to be applied to the heads of the shaft section with its cylindrical inner periphery 9 evenly contacting with the said heads. The body 8 is provided with relatively spaced, longitudinally extending grooves 10 in its inner periphery, equal in number to the bearing balls 11 provided in the sockets of each shaft head and adapted to slidably and rotatably receive the said balls.

The bearings 5 and 6 for the shaft sections are disposed in such proximity to the ends of the body 8 that they will serve as means for preventing excessive longitudinal sliding movement of the body upon the heads of the shaft sections, thus preventing the said body from becoming disengaged with either of the shaft heads. When the body 8 is disposed at an angle to the shaft sections as shown in these figures of drawing, which angle is not too great, the universal joint provided thereby between the shaft sections will be positive in operation, thus affording an efficient connection between the same. This form of coupling may be used as described in connection with driving and driven shaft sections, so as to obviate the necessity of lining up the shaft sections absolutely true when installing the machinery including the said shaft sections, and thus avoiding the usual delay and labor incident with such an operation.

In applying the body of the coupling to the heads of the shaft sections, each of the latter is inserted into either end of the said body after the positioning of the bearing balls within the sockets of the shaft heads. This operation is very simple and the detachment of the said parts of the coupling is no more difficult.

In the drawings, simple and readily applied means is disclosed for limiting the longitudinal movement of the body of the coupling with respect to the heads provided upon the shaft sections. This limiting means comprises a limiting member in the form of a circular plate or disk 12 which is adapted to be positioned centrally within the body 8 and to be secured therein by means of screws 13 detachably mounted in the said body, or by any other suitable, removable means. Radial projections 14 are formed upon the outer periphery of the member 12 for engagement within the body grooves 10. This limiting member is adapted to engage the heads 3 and 4 of the shaft sections upon movement of the said body in either direction so as to prevent disengagement of the body with either of the said heads. The employment of limiting means of this nature in connection with the body of the coupling obviates the necessity of positioning the bearings for the shaft sections in such close proximity to the shaft heads of the coupling device, which arrangement would oftentimes prove undesirable.

From the foregoing description, taken in connection with the accompanying drawing, it should be apparent to those skilled in the art to which this invention appertains that I have provided a simply constructed and efficient shaft coupling which is adaped to be used in numerous capacities and which will meet all of the requirements of usage, but it is to be understood that minor changes in the construction of the same may be resorted to in practice without departing from the scope of the invention.

Having thus described my invention, what I claim is:

In a shaft coupling, the combination with the adjacent ends of a pair of coacting shaft sections, of a hollow cylindrical body having relatively spaced longitudinal grooves in its inner periphery, heads provided upon the said shaft ends for engagement within the ends of the said body, means carried by each head for sliding engagement within the body grooves to prevent relative rotation of the body and head, a circular limiting member adapted to be positioned medially within the said body between the shaft heads, radial projections provided upon the outer periphery of the said limiting member for sliding engagement within the body grooves, and removable means for securing the limiting member to the body in its operative position.

In testimony whereof I affix my signature in presence of two witnesses.

JOHN J. WALLBILLICH.

Witnesses:
 RAYMOND G. RHINESMITH,
 ERNEST W. FRAZIER.